United States Patent
Hinz et al.

(10) Patent No.: US 7,322,658 B2
(45) Date of Patent: Jan. 29, 2008

(54) HYDRAULIC UNIT FOR ANTI-SLIP BRAKING SYSTEMS

(75) Inventors: Axel Hinz, Neu Anspach (DE);
Hans-Dieter Reinartz, Frankfurt/M (DE); Albrecht Otto, Schöneck (DE); Dieter Dinkel, Schwalbach (DE)

(73) Assignee: Continental Teves AG & Co OhG, Frankfurt (DE)

( * ) Notice: Subject to any disclaimer, the term of this patent is extended or adjusted under 35 U.S.C. 154(b) by 238 days.

(21) Appl. No.: 10/529,323

(22) PCT Filed: Sep. 9, 2003

(86) PCT No.: PCT/EP03/09975

§ 371 (c)(1),
(2), (4) Date: Mar. 25, 2005

(87) PCT Pub. No.: WO2004/031013

PCT Pub. Date: Apr. 15, 2004

(65) Prior Publication Data

US 2006/0138860 A1    Jun. 29, 2006

(30) Foreign Application Priority Data

Sep. 27, 2002 (DE) ............................... 102 45 068

(51) Int. Cl.
*B60T 8/36* (2006.01)
(52) U.S. Cl. ................. 303/119.3; 303/116.4; 303/DIG. 10
(58) Field of Classification Search ........ 303/DIG. 10, 303/119.3, 116.4; 137/884
See application file for complete search history.

(56) References Cited

U.S. PATENT DOCUMENTS

| | | | |
|---|---|---|---|
| 4,580,848 A | | 4/1986 | Widmer |
| 4,779,936 A | * | 10/1988 | Farr ........................ 303/116.4 |
| 6,398,315 B1 | * | 6/2002 | Dinkel et al. ............ 303/113.1 |
| 6,672,686 B2 | * | 1/2004 | Lubischer ................ 303/116.4 |
| 6,688,707 B1 | * | 2/2004 | Dinkel et al. ............ 303/119.3 |

FOREIGN PATENT DOCUMENTS

| | | |
|---|---|---|
| DE | 198 05 843 A1 | 5/1999 |
| DE | 199 61 851 A1 | 6/2001 |
| DE | 100 60 225 A1 | 10/2001 |
| DE | 101 00 103 A1 | 7/2002 |
| DE | 101 31 757 A1 | 8/2002 |
| WO | WO 99/13252 | 3/1999 |
| WO | WO 00/46089 | 8/2000 |
| WO | WO 01/72568 | 10/2001 |

OTHER PUBLICATIONS

Patent Abstract of Japan, vol. 1998, No. 14, Dec. 31, 1998, & JP 10 258724 A (Toyota Motor Corp) Inventor: Okubo Katsuyasu.

* cited by examiner

*Primary Examiner*—Bradley King
(74) *Attorney, Agent, or Firm*—Ratner Prestia (57) ABSTRACT

In order to produce a compact hydraulic unit for use in an electrohydraulic braking system, the invention discloses that a first accommodating bore for a first feeding device of a pump is passed through between valve accommodating bores of a first and second valve row, and in that second and third accommodating bores for the accommodation of second and third feeding devices of the pump ae passed through between valve accommodating bores; of a third valve row.

9 Claims, 8 Drawing Sheets

HYDRAULIC UNIT FOR ANTI-SLIP BRAKING SYSTEMS

TECHNICAL FIELD

The present invention relates to a hydraulic unit for slip-controlled braking systems.

BACKGROUND OF THE INVENTION

DE 198 05 843 A1 discloses a hydraulic unit for a slip-controlled braking system whose accommodating member contains valve accommodating bores in a first and a second valve row for the accommodation of inlet and outlet valves. Spaced from the two valve rows, a third valve row accommodating so-called special valves is arranged in the block-shaped accommodating member. Between the valve rows arranged in pairs and the third valve row, a pump accommodating bore for a pump driving element is provided in the accommodating member. Accommodating bores for two feeding devices extend in parallel to the valve rows and at right angles to the opening direction of the valve accommodating bores into the accommodating member.

The prior art unit is inappropriate for the use in an electrohydraulic braking system, wherein the vehicle operator only expresses a braking request, which is realized by the braking system so-to-speak 'by-wire'. This is because in systems of this type it is the purpose of the pump to load a high-pressure accumulator that is used for the pressure increase in the wheel brakes. Based on the high-pressure volume to be supplied, a pump is necessary which not only furnishes pressure fluid under high pressure but also a great pressure fluid volume flow at low operating noises.

It is principally known to use pumps with e.g. three feeding devices for loading a pressure fluid accumulator.

Integrating pumps of this type into a principally known accommodating member of a hydraulic unit—compared to conventional pumps—requires larger space. This contradicts the miniaturization requirement.

BRIEF SUMMARY OF THE INVENTION

Therefore, an object of the invention is to improve upon a hydraulic unit with several feeding devices of the indicated type in such a manner that it is well suited for employment in electrohydraulic braking systems (EHB), while the mounting space in the accommodating member is efficiently used and little operating noises are encountered.

According to the invention, this object is achieved for a hydraulic unit of the type mentioned hereinabove wherein a first accommodating bore for a first feeding device of the pump is passed between valve accommodating bores of the first and second valve row, and a second and third accommodating bore for the accommodation of second and third feeding devices of the pump is passed between valve accommodating bores of the third valve row.

DETAILED DESCRIPTION OF THE PREFERRED EMBODIMENT

Figure 1:
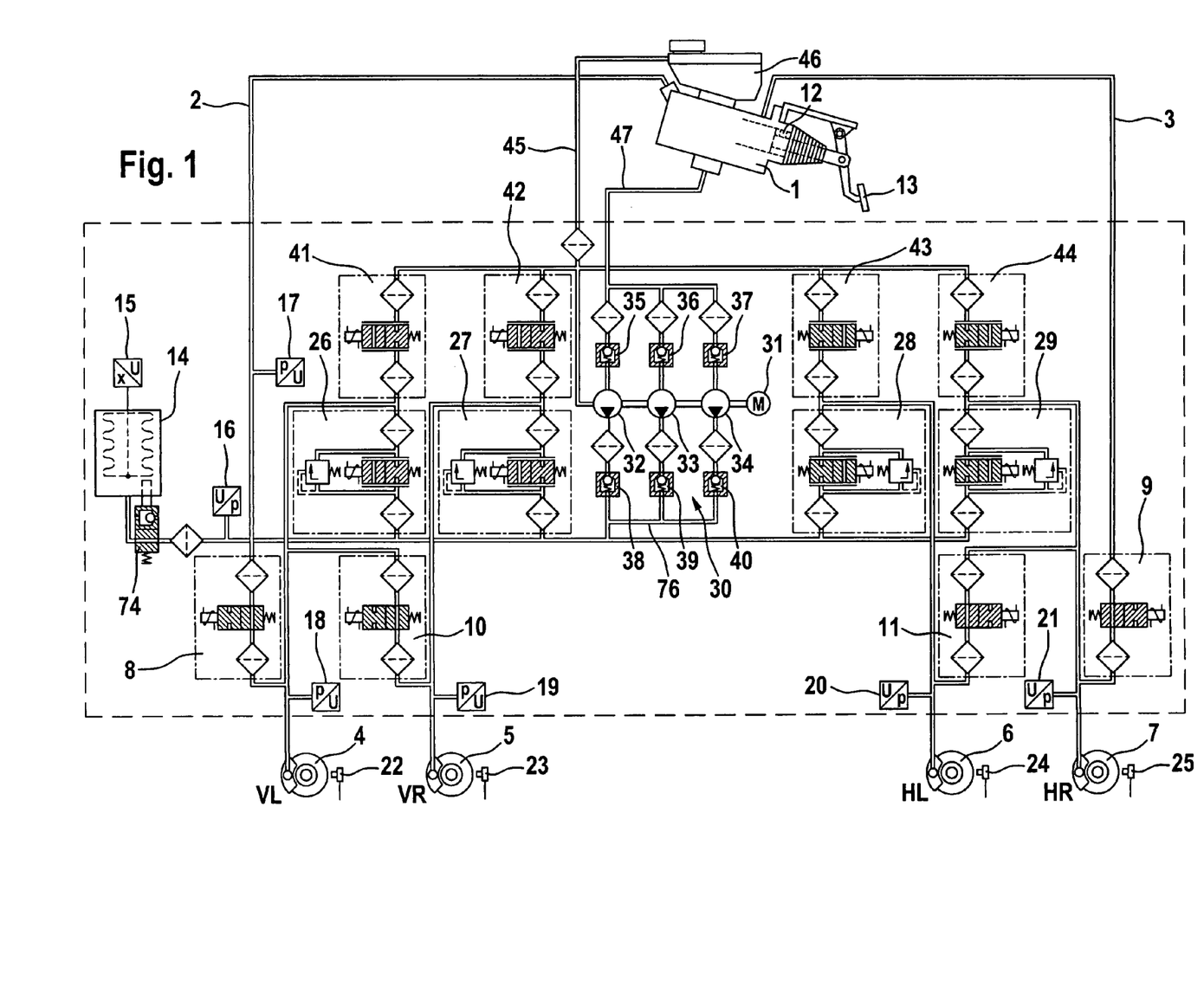
FIG. 1 is a schematized hydraulic circuit diagram for illustrating the channel routing of an electrohydraulic braking system.

The circuit diagram of an electrohydraulic braking system with a so-called black-and-white circuit allotment as represented in FIG. 1 comprises a pedal-operated tandem master cylinder 1 with simulator means, and two wheel brakes 4 (VL—front left), 5 (VR—front right); 6 (HL—rear left), 7 (HR—rear right) per axle are respectively connected to the hydraulic brake circuits 2, 3, as usual. The interposed hydraulic valves 8, 9; 10, 11 are open in their de-energized condition. Reference numerals 8, 9 designate separating valves that separate, when energized, the master cylinder 1 from the wheel brakes 4 to 7. In the normal operation, valves 10, 11 serve for a pressure balance between the wheel brakes 4, 5; 6, 7 of an axle and can be closed selectively for the purpose of a driving stability control intervention or for the braking pressure control on each individual wheel.

After activation of the separating valves 8, 9, the brake circuits 2, 3 are interrupted at least in the area of lines leading from the tandem master cylinder 1 to the wheel brakes 4 to 7 so that the braking operation or the braking pressure variation in the wheel brakes 4 to 7 is determined exclusively in a sensoric fashion in dependence on electric signals that are obtained by way of a pedal travel sensor 12 for detecting the actuation of the brake pedal 13 or by means of any other brake actuation member (SBC, Sensoric Brake Control).

Further, the brake system comprises a high-pressure accumulator 14, herein e.g. a pleated-bellows accumulator, which is equipped with a travel sensor 15 for determining the accumulator's filling level in the embodiment shown and is used for detecting the travel of a media-separating element. However, the travel sensor 15 is not absolutely necessary when a co-called separating piston is e.g. provided between the separating valve 8 and the wheel brake 4, 5. This embodiment is expressly covered by the entire disclosure. A pressure sensor 16 is associated with the high-pressure accumulator 14 to measure the hydraulic pressure.

The pressure defined by the vehicle operator is measured in one of the brake circuits 2, 3 by means of a pressure sensor 17. Further pressure sensors 18, 19, 20, 21 measure the actual pressure in the wheel brakes 4, 5, 6, 7. The wheel rotational behavior is sensed by way of wheel rotation sensors 22, 23, 24, 25.

It can be easily seen in the circuit diagram that braking pressure can be conducted from a pressure source to the wheel brakes 4 to 7 by changing over normally closed inlet valves 26, 27, 28, 29. The pressure source mainly comprises the high-pressure accumulator 14 and a pump 30, especially a piston pump driven by an electric motor 31 and comprising three feeding devices 32, 33, 34 which are connected to a pressure chamber of the master cylinder 1 on the suction side by way of each one non-return valve 35, 36, 37 and a joint suction channel 47. Apart from balanced inertia forces, the disclosed three-piston pump exhibits low pulsations so that insignificant operating noises occur.

Figure 6:
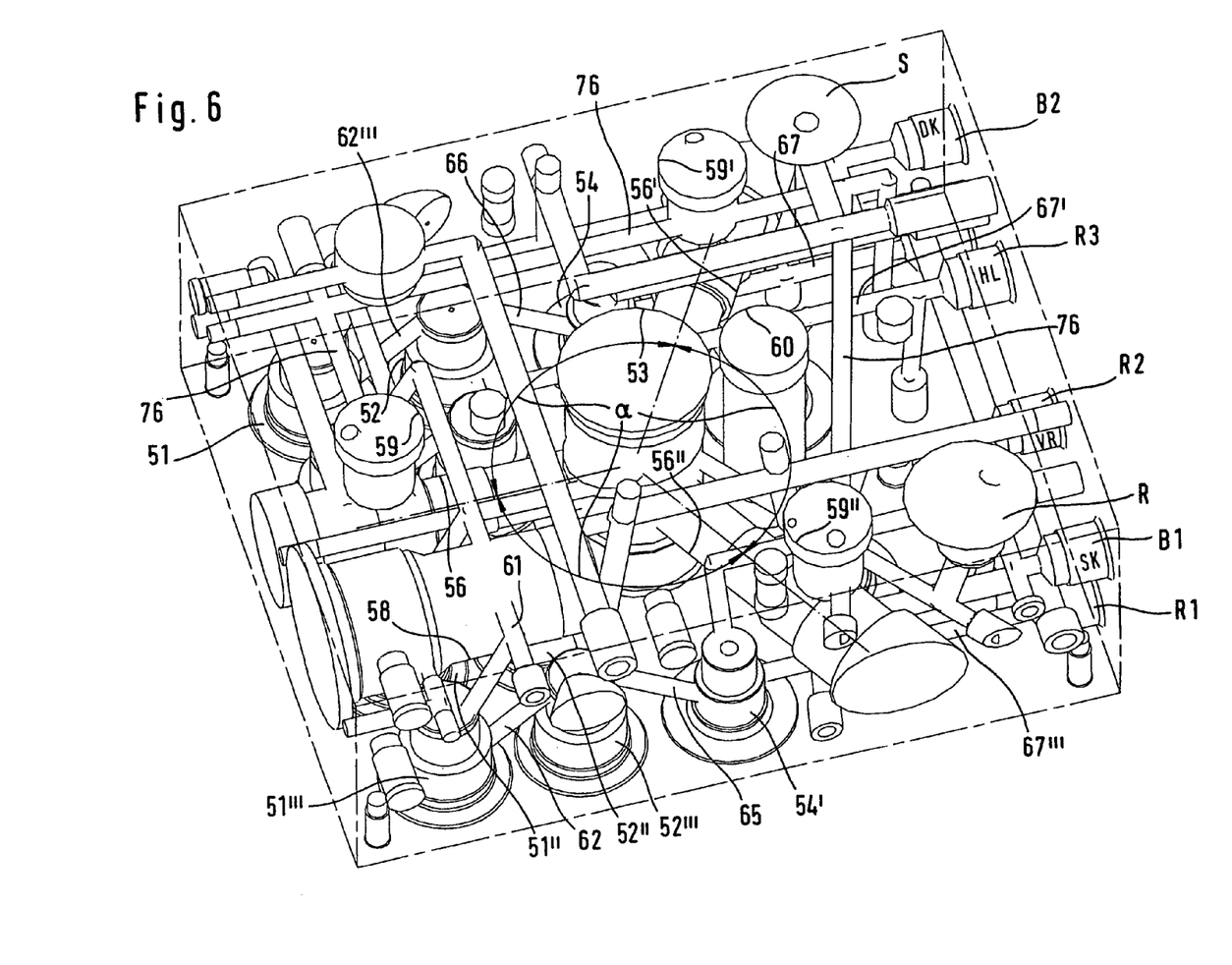
FIG. 6 is another view of the accommodating member for illustrating accommodating bores of non-return valves.

To load the high-pressure accumulator 14, each feeding device 32, 33, 34 has non-return valves 38, 39, 40 (pressure valves) which lead to a joint, substantially U-shaped collecting main 76 provided with a filter and opening into the high-pressure accumulator 14 (FIG. 6). It is thereby ensured that filtered pressure fluid is available in the high-pressure accumulator 14. Subsequent components such as valve seats in particular are not contaminated or damaged. The pressure in the wheel brakes 4 to 7 is metered by a corresponding, advantageously proportionally controlled actuation of the inlet valves 26 to 29. To reduce the braking pressure in the wheel brakes 4 to 7, outlet valves 41 to 44 are provided having outlets that lead through a return channel 45 to a pressure fluid reservoir 46.

All components and aggregates arranged within an area shown in dotted lines in FIG. 1 are arranged directly at or in an accommodating member 48 of a hydraulic unit (HCU), the details thereof being described in the following by way of FIG. 2 to 8.

Figure 2A:
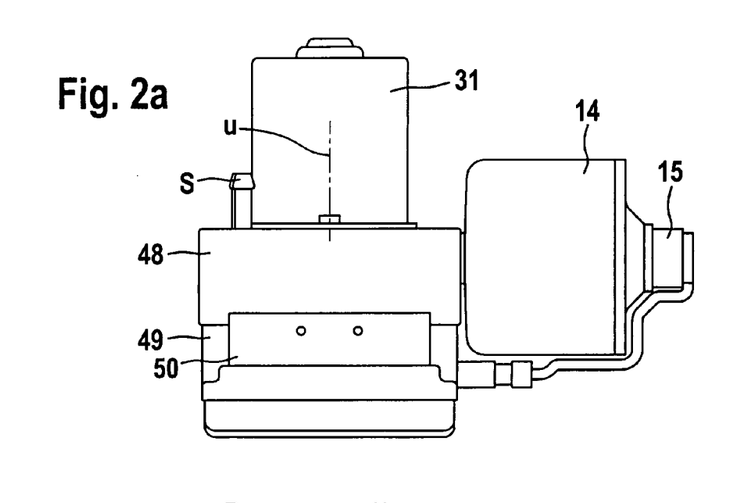
FIG. 2*a,b,c* show a hydraulic unit in a front view (FIG. 2*a*), side view from the left (FIG. 2*b*), and in a top view (FIG. 2*c*), each on a small scale.
Figure 2B:
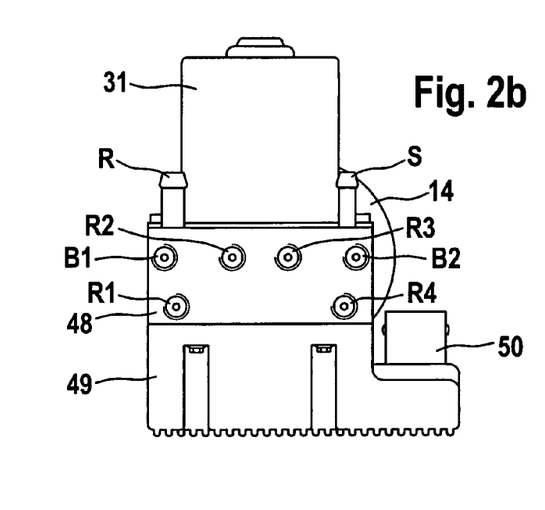
Figure 2C:
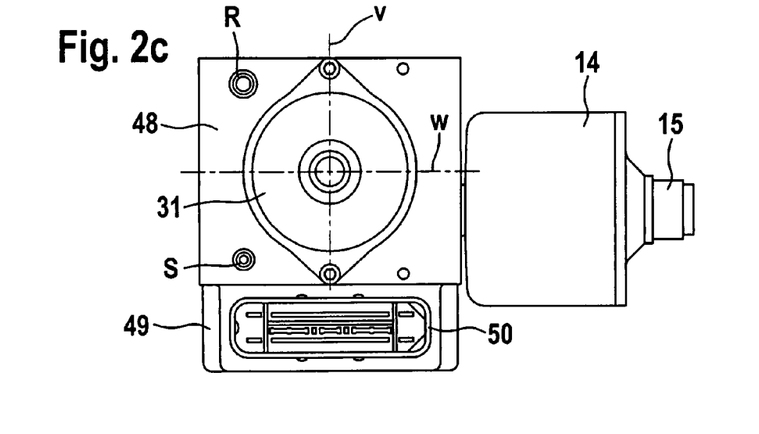
Figure 3:
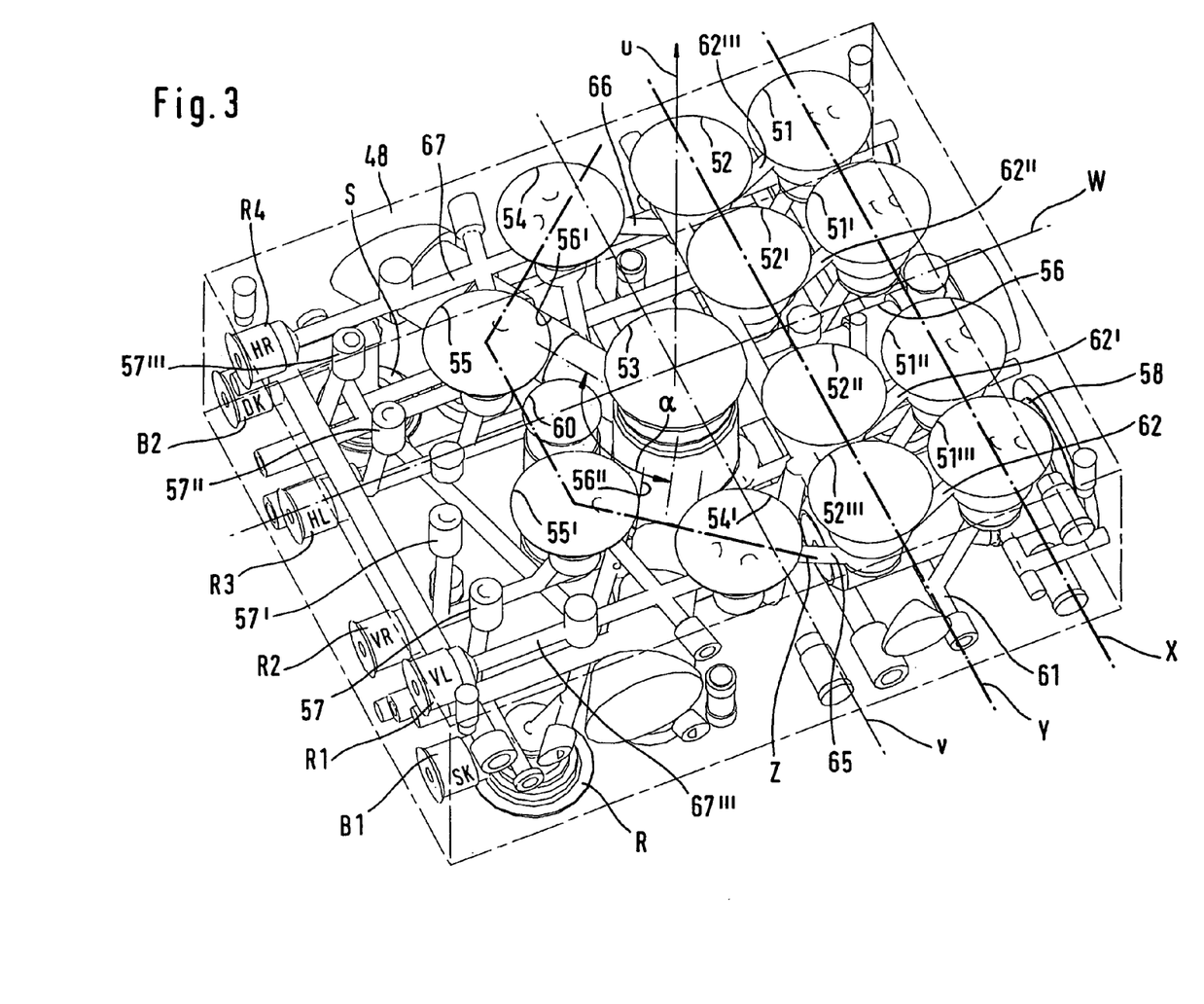
FIG. 3 is a three-dimensional view of an accommodating member for the illustration of accommodating bores and the channel routing.
Figure 4:
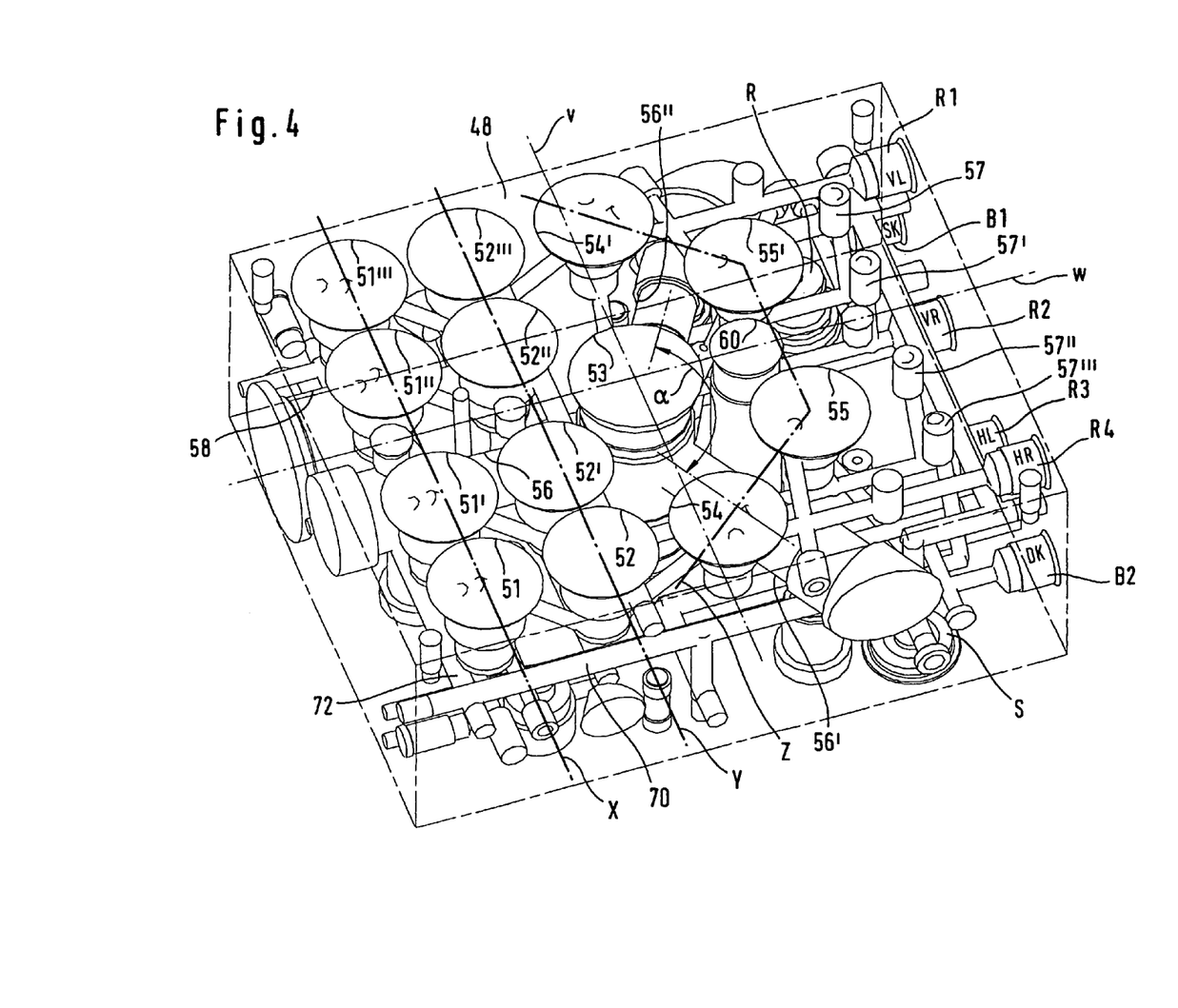
FIG. 4 is a three-dimensional view of the accommodating member in FIG. 3, turned by 180° about a vertical axis u.

FIG. 2*a*,*b*,*c* exhibit the hydraulic unit with aggregates mounted on the accommodating member 48 such as electric motor 31, housing 49 for an electronic control unit (ECU), and high-pressure accumulator 14. Electric motor 31 and housing 49 are arranged on opposed top and bottom sides of the accommodating member 48. A multipoint connector 50 for connecting the ECU including electric motor 31 to a power supply and a vehicle-end bus system is provided laterally beside the accommodating member 48 and pointing in parallel to an axis of the electric motor 31. The high-pressure accumulator 14 is arranged on a longitudinal side of the accommodating member 48 tilted by 90° about a vertical axis u between electric motor 31 and housing 49 and opposite the side with the wheel ports R1 to R4, which allows an especially compact construction and an arrangement of bores in the accommodating member 49 that optimizes the mounting space. When the installation position of the hydraulic aggregate in the vehicle is chosen so that the high-pressure accumulator 14 points in a vertically downward direction, air entering into the system on the accumulator side (e.g. due to an accumulator defect) will ascend in the accumulator accommodating bore 59 so that it can be easily removed from the accommodating member 48 by means of ventilation methods.

However, it must be noted that types of construction are also possible, wherein the electric motor 31 and the high-pressure accumulator 14 are arranged on one common side of the accommodating member 48, with the result of an arrangement of these components in the vehicle, which is especially uniform and allows ease of access for servicing purposes.

Figure 8:
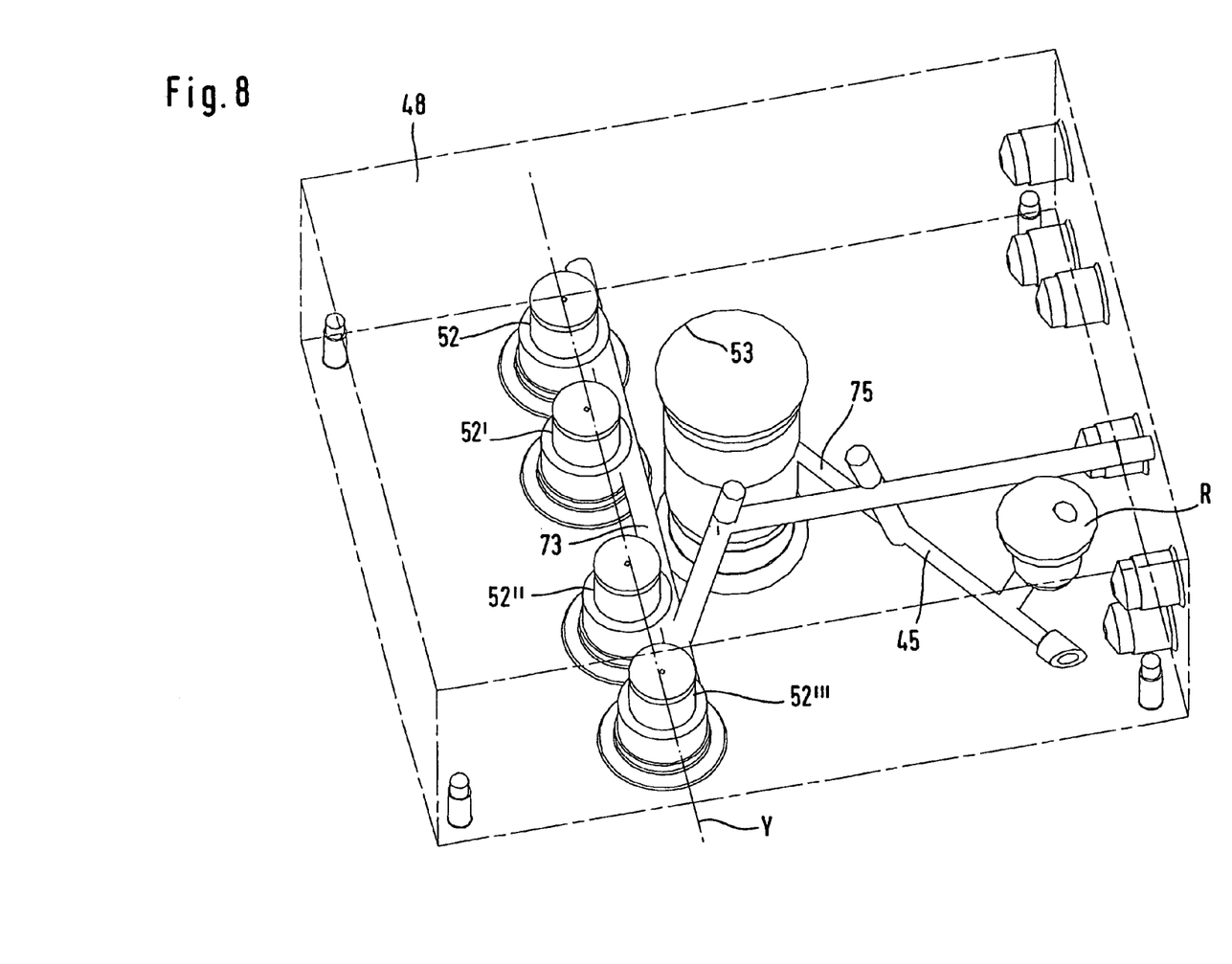
FIG. 8 shows details of the accommodating member for illustrating the pressure fluid return line.

The travel sensor 15 close to the accumulator is electrically connected to the ECU by way of a line. On a longitudinal side opposite to the high-pressure accumulator 14, there are hydraulic ports R1 to R4 for the wheel brakes 4 to 7 and ports B1, B2 for circuits 2, 3 (pressure chambers) of the master cylinder 1. A return connection R for connecting the pressure fluid reservoir 46 to the pump-side return channel 45 is provided on a top side close to the motor. The return channel 45 divides and opens, on the one hand, by means of a bypass 75 into a crankcase within the pump accommodating bore 53 that is principally filled with pressure fluid and, on the other hand, into a collecting main 73 interconnecting the accommodating bores 52 to 52''' (outlet valve accommodating bores) (FIG. 8). Further, a suction port S is provided on the top side, through which a suction channel 47 of the pump 30 is connected to the pressure fluid reservoir 46.

FIG. 3 to 8 display the architecture of the accommodating member 48 on a considerably enlarged scale. Accommodating member 48 comprises in each one first and one second valve row X, Y a total of eight valve accommodating bores 51,51',51", 51''' (inlet valve accommodating bores); 52,52', 52",52''' (outlet valve accommodating bores), into which the electromagnetically operable inlet and outlet valves (26 to 29; 41 to 44) can be inserted. Adjoining the valve row Y is a pump accommodating bore 53 for the accommodation of at least one pump driving element such as an eccentric for driving pump pistons. The pump accommodating bore 53 extends in a paraxial manner to the valve accommodating bores (51 to 51''', 52 to 52'''), is used as a crankcase at least in part and accommodates an eccentric or crank drive serving to drive the pump 30.

Further, FIG. 3 to 6 exhibit a third valve row Z opening into the housing surface of the accommodating member 48 beside the pump accommodating bore 53 and remote from, and opposite to, the first and second valve row X, Y. Said third valve row Z ensures, among others, the possibility of a wheel-individual braking pressure control and also a traction slip control function or driving dynamics control function. The separating valves 8, 9 can be inserted into outside valve accommodating bores 54, 54'. The pressure compensating valves 10, 11 can be inserted into the two interposed valve accommodating bores 55, 55'. As can be seen, the exact arrangement of the valve row Z in a trapezoidal shape differs from the linear arrangement of the other two valve rows X, Y. In general, modified types of arrangements are also possible for the valve rows X, Y, Z if the series character is maintained at least to a limited degree.

The arrangement of the ports B1, B2 of the master cylinder 1 opening into the accommodating member 4 and the portions R1, R2, R3, R4 leading to the wheel brakes allows a uniform connecting pattern for brake lines at a lateral surface of the accommodating member 48. Advantageously, this lateral surface in the vehicle points in an upward direction so that ease of access thereto is ensured for the assembly or disassembly.

For the accommodation of the three feeding devices 32, 33, 34, there is provision of three accommodating bores 56 to 56" extending in a star-like fashion from the pump accommodating bore 53, with the first bore thereof being passed through between valve accommodating bores 51', 51";52',52" of the first and second valve row X,Y, and the second and third accommodating bore 56', 56" being passed through between valve accommodating bores (54,55;54',55') of the third vale row Z so that the available mounting space is optimized.

As can be seen, the accommodating bore 56 extends transversely to the two valve rows X,Y. Adjacent accommodating bores 56, 56',56" are arranged in each case like a v and at an identical angle α of 120° relative to each other. On the outside, each accommodating bore 56,56',56" includes the non-return valve 35,36,37 (suction valve) for the pressure fluid ventilation in a compression chamber. It is to be understood that each feeding device 32,33,34 can include in a known fashion translatorily movable displacement pistons, which are directly guided in the material of the accommodating member 48 or in bushings made of wear-resistant material.

Spaced from the third valve row Z is a row with pressure sensor accommodating bores 57, 57',57",57''', and at least an outside part of the accommodating bore 56',56" extends in each case between a valve accommodating bore 54, 54' of the third valve row Z and a pressure sensor accommodating bore 57, 57'''. It must be noted that further pressure sensor accommodating bores for pressure sensors 16, 17 are optionally feasible, which are used to sense the pressure in a circuit 2, 3 of the master cylinder 1 or in the high-pressure accumulator 14.

Parallel to the axis of the first accommodating bore 56 and arranged with said on one single frontal end of the accommodating member 48 is an accumulator accommodating bore 58 which is connected to the high-pressure accumulator 14, on the one hand, and to the feeding devices 32, 33, 34 by way of hydraulic channels and interposed non-return valves 38 to 40 (pressure valves), on the other hand. The space available on this side is optimally utilized due to this arrangement. This is because a closing valve 74 is provided between the high-pressure accumulator 14 and the wheel brakes 4 to 7, being integrated within the accumulator accommodating bore 58 or a connecting socket to be screwed into the accumulator accommodating bore 58. As can be taken from the FIG., the accumulator accommodating bore 58 is arranged at right angles to the direction in which the valve rows X, Y extend between respectively adjacent valve accommodating bores 51'',51'''; 52'',52'''. Non-return valve accommodating bores (pressure valve accommodating bores) 59,59',59'' are arranged in parallel to the axis of the pump accommodating bore 53 and open each into an associated accommodating bore 56,56',56'' for a corresponding feeding device 32,33,34 (FIG. 6).

It must be added that a through-bore 60 is provided between the accommodating bores 56',56'', which can be made use of as a passage for an electric supply line for the electric motor 31. Further through-bores for the passage of further elements such as for the electrical connection of the travel sensor 15 in particular are possible. It is further feasible to provide through-bores for fastening means in order to attach the electric motor 31 and the housing 49 of the ECU to the accommodating member 48 by way of the same pressure force.

Figure 5:
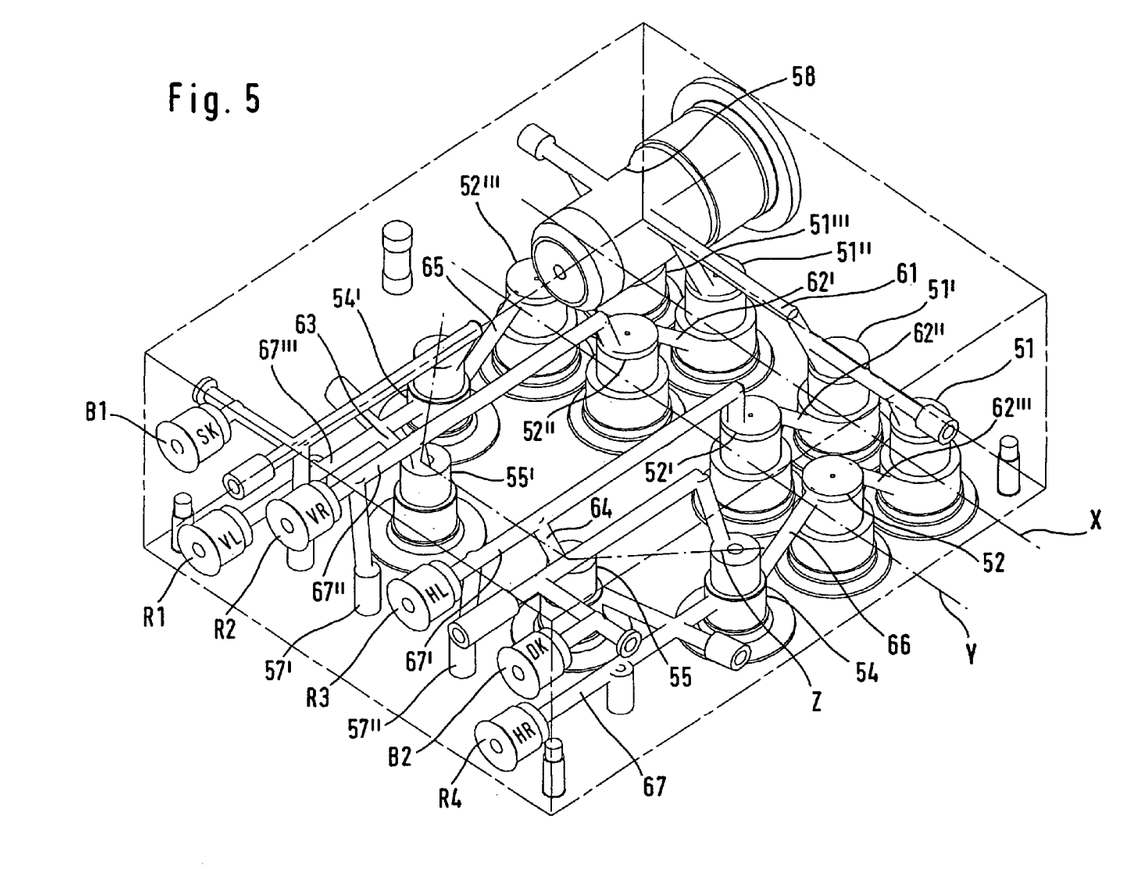
FIG. 5 is a view of an accommodating member according to FIG. 3, highly simplified due to the omission of pump bores and turned by 180° about a longitudinal axis w.

Details with respect to the arrangement of bores in the accommodating member 48 can be seen in FIG. 5 to 8. In particular FIG. 5 illustrates the closable hydraulic connection of the high-pressure accumulator 14 to the wheel brake ports R1 to R4. The accumulator accommodating bore 58 is connected to the valve accommodating bores 51 to 51''' of the first valve row X by way of a transverse channel 61 for pressure supply purposes. With a corresponding valve actuation, the pressure fluid propagates from each inlet valve accommodating bore 51 to 51''' through a connecting channel 62,62',62'',62''' to a valve accommodating bore 52 to 52''' for an outlet valve 41 to 44. Compensating channels 63, 64 serve for the pressure compensation between the wheel brakes 4, 5; 6, 7 of an axle if the compensating valves 10, 11 (as can be taken from FIG. 1) are open. Channels 65, 66 lead from outside valve accommodating bores 52, 52''' to the valve accommodating bores 54, 54' for the separating valves 8, 9 which in turn are connected to the wheel brake ports R1 to R4 by way of connecting channels 67,67',67'',67'''.

Figure 7:
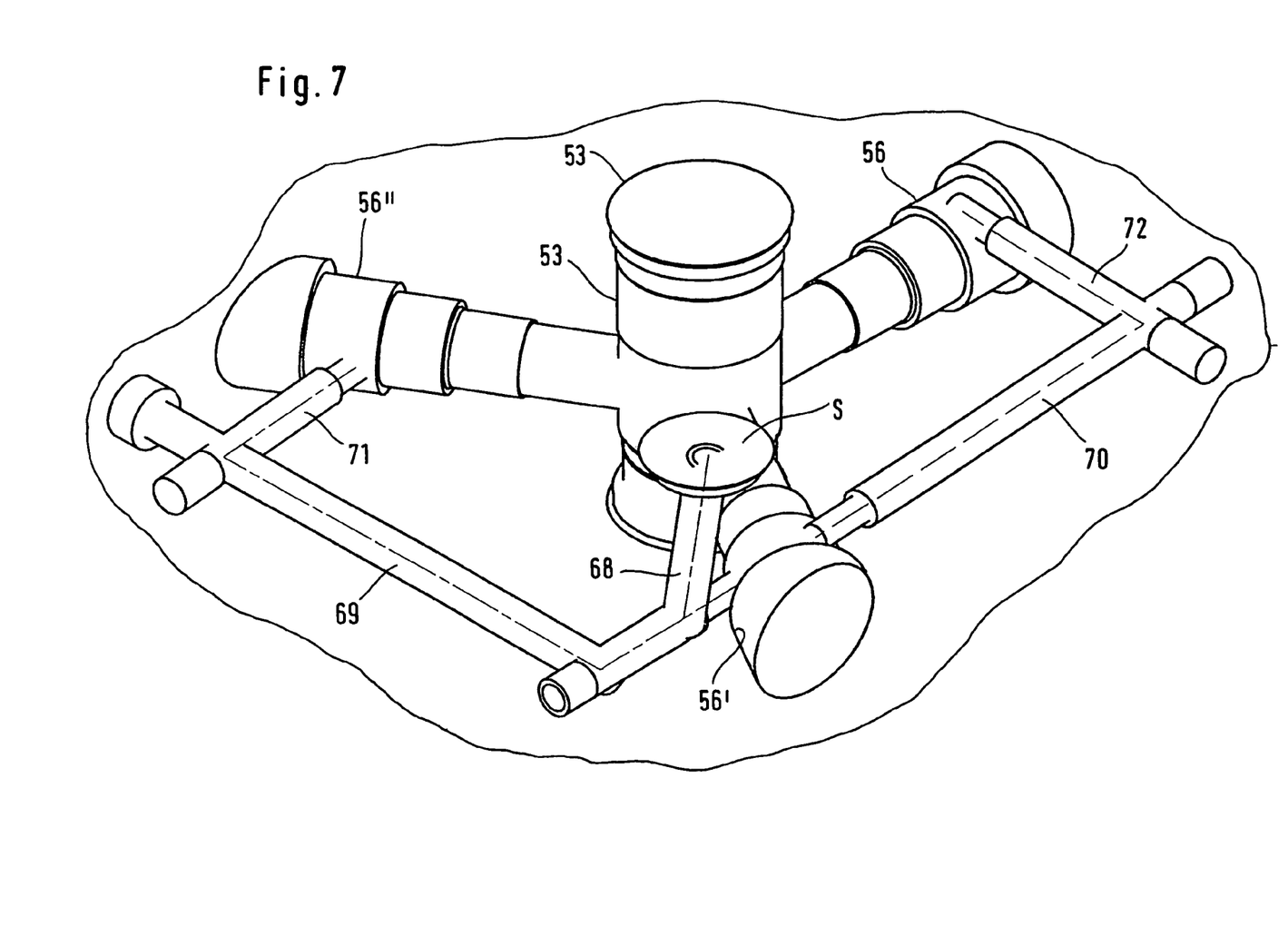
FIG. 7 shows details of the accommodating member for illustrating the pump suction side.

FIG. 7 illustrates the pump suction side with a suction port S that is provided with a small lateral offset relative to the accommodating bore 56' for the second feeding device 33. By way of a substantially vertical connecting portion 68, the suction port S opens into two L-shaped line portions 69, 70, extending from which into the accommodating bores 56'',56 are connecting pieces 71, 72 that are bent off substantially at right angles. Due to this arrangement the feeding device 33 has the smallest aspiration length, while the aspiration length of the feeding devices 32 and 34 is roughly equal.

The pressure fluid return in the direction of the pressure fluid reservoir 46 can be seen in FIG. 8. The outlet valves 41 to 44 are opened to discharge the pressure into the wheel brakes 4 to 7. A collecting main 73 extending in parallel to the valve row Y interconnects all outlet valve accommodating bores 52 to 52''' and leads through a return channel 45 to the return port R which is hydraulically connected to the pressure fluid reservoir 46. A filter is advantageously inserted into the return port R so that filtered pressure fluid enters into the pressure fluid reservoir 46. It can be seen that a bypass 75 extends between the flooded crankcase in the pump accommodating bore 53 and the return channel 45 so that possible leakage fluid of the feeding devices 32 to 34 is furthermore available to the pressure fluid circulation. This is a basic advantage compared to systems wherein leakage fluid is discharged into a separate reservoir or into the ambience and thereby causes the filling level of the pressure fluid reservoir to drop.

Although the arrangement of bores in the accommodating member 48 has been described making reference to the example of a pump 30 of the piston type comprising three feeding devices 32 to 34 and three accommodating bores 56 to 56''' for the feeding devices 32 to 34, said arrangement of bores, with the exception of the configuration of the suction and pressure channels, can also be provided along with a different type of pump, e.g. with a two-piston pump (greater pulsations, therefore increased operating noise) or in connection with a gear pump (very insignificant pulsations, i.e. a very low operating noise). The latter design is further advantageous because there is no need for non-return valves for the ventilation of compression chambers, which permits a major reduction in costs and components. Related thereto is also a considerable reduction in mounting space.

LIST OF REFERENCE NUMERALS

1 master cylinder
2,3 brake circuit
4,5,6,7 wheel brake
8,9 separating valve
12 pedal travel sensor
13 brake pedal
14 high-pressure accumulator
15 travel sensor
16-21 pressure sensor
22-25 wheel rotation sensor
26-29 inlet valve
30 pump
31 electric motor
32,33,34 feeding device
35-40 non-return valve
41-44 outlet valve
45 return channel
46 pressure fluid reservoir
47 suction channel
48 accommodating member
49 housing
50 multipoint connector
51-51''' valve accommodating bore (inlet valves)
52-52''' valve accommodating bore (outlet valves)
53 pump accommodating bore
54,54' valve accommodating bore
55,55' valve accommodating bore
56,56',56'' accommodating bore
57-57''' pressure sensor accommodating bore 58 accumulator accommodating bore
59-59' non-return valve accommodating bore
60 through-bore
61 transverse channel
62-62''' bypass
63,64 compensating channel
65,66 channel
67-67''' connecting channel
68 connecting portion
69,70 line portion
71,72 connecting piece
73 collecting drain
74 closing valve
75 bypass
76 collecting drain
R1, R2 wheel brake ports (VA—front axle)
R3, R4 wheel brake ports (HA—rear axle)
S suction port
R return port
B1, B2 braking pressure generator ports
X,Y,Z valve rows
u vertical axis
v transversal axis
w longitudinal axis
α angle

The invention claimed is:

1. A hydraulic unit for slip-controlled brake systems,
including an accommodating member which accommodates inlet and outlet valves in several valve accommodating bores of a first and a second valve row,
including further valve accommodating bores arranged in a third valve row spaced from the first and the second valve row,
including a pump accommodating bore arranged between the second and the third valve row for the accommodation of at least one pump driving element, and accommodating bores for the accommodation of feeding devices of a pump, and
including several pressure fluid channels that connect the valves, a high-pressure accumulator and wheel brakes, and are able to establish a hydraulic connection between the high-pressure accumulator and the wheel brakes or a braking pressure generator and the wheel brakes, wherein
a first of said accommodating bores for the accommodation of feeding devices of a pump extends transversely to the first and the second valve row, and
wherein second and third accommodating bores for the accommodation of second and third feeding devices of a pump extend transversely to the third valve row.

2. The hydraulic unit as claimed in claim 1, wherein the accommodating bores for feeding devices are arranged at an angle (α) relative to each other.

3. The hydraulic unit as claimed in claim 1 comprising accommodating bores for feeding devices that are arranged at an angle (α) relative to each other, wherein
the angle (α) between respectively adjacent accommodating bores is identical and amounts to 120°.

4. The hydraulic unit as claimed in claim 1, wherein
a row of pressure sensor accommodating bores are provided being arranged beside the third valve row.

5. A hydraulic unit for slip-controlled brake systems,
including an accommodating member which accommodates inlet and outlet valves in several valve accommodating bores of the first and the second valve row,
including further valve accommodating bores arranged in the third valve row spaced from the first and the second valve row,
including a pump accommodating bore arranged between the second and the third valve row for the accommodation of at least one pump driving element, and accommodating bores for the accommodation of feeding devices of a pump, and
including several pressure fluid channels that connect the valves, a high-pressure accumulator and wheel brakes, and are able to establish a hydraulic connection between the high-pressure accumulator and the wheel brakes or a braking pressure generator and the wheel brakes,
a first of said accommodating bores for the accommodation of feeding devices of a pump extends transversely to the first and the second valve row, and
a second and a third of said accommodating bores for the accommodation of feeding devices of a pump extend transversely to the third valve row,
the first, second and third of said accommodating bores for feeding devices are arranged at an angle (α) relative to each other wherein
an accumulator accommodating bore is provided in parallel to the axis of the first accommodating bore for the feeding device, and in that the accumulator accommodating bore and the first accommodating bore are arranged at a frontal end of the accommodating member.

6. The hydraulic unit as claimed in claim 5, wherein the accumulator accommodating bore is passed through between adjacent valve accommodating bores and at right angles relative to the first and second valve rows.

7. A hydraulic unit for slip-controlled brake systems, including a first, second and third valve row, wherein each of said valve rows comprises a plurality of valve accommodating bores,
including an accommodating member which accommodates inlet and outlet valves in several valve accommodating bores of the first and a the second valve row,
including further valve accommodating bores arranged in the third valve row spaced from the first and the second valve row,
including a pump accommodating bore arranged between the second and the third valve row for the accommodation of at least one pump driving element, and accommodating bores for the accommodation of feeding devices of a pump, and
including several pressure fluid channels that connect the valves, a high-pressure accumulator and wheel brakes, and are able to establish a hydraulic connection between the high-pressure accumulator and the wheel brakes or a braking pressure generator and the wheel brakes,
a first of said accommodating bores for feeding devices of a pump extends transversely to the first and the second valve row, and
second and third accommodating bores for the accommodation of second and third feeding devices of a pump extend transversely to the third valve row, wherein
a non-return valve accommodating bore opens into each accommodating bore for a feeding device, and in that the non-return valve accommodating bore is arranged in parallel to the axis of the pump accommodating bore.

8. The hydraulic unit as claimed in claim 7, wherein
a through-bore is provided between the second and the third accommodating bore and the through-bore serves as a passage for an electric line.

9. The hydraulic unit as claimed in claim 1, wherein
a collecting duct connects a pressure side of the feeding devices to the high-pressure accumulator.

* * * * *